Figure 6:
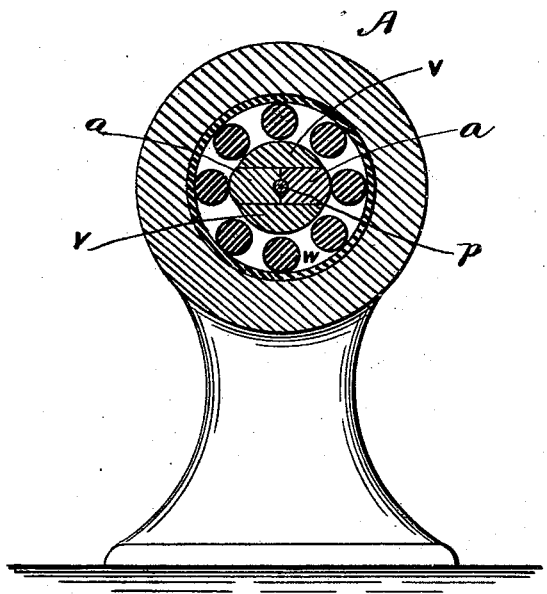

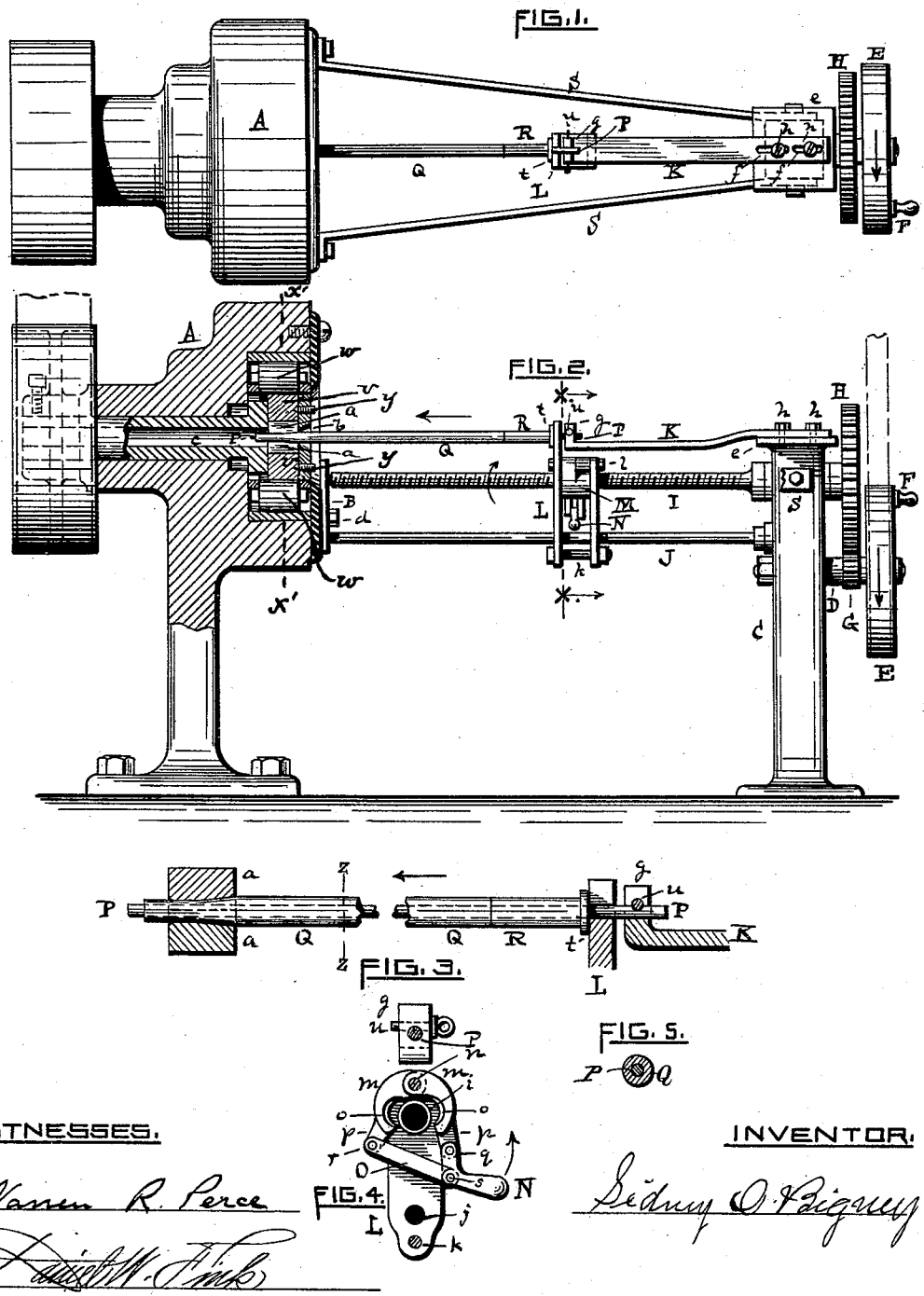

(No Model.) 2 Sheets—Sheet 2.

S. O. BIGNEY.
SWAGING MACHINE.

No. 475,077. Patented May 17, 1892.

United States Patent Office.

SIDNEY O. BIGNEY, OF ATTLEBOROUGH, MASSACHUSETTS.

SWAGING-MACHINE.

SPECIFICATION forming part of Letters Patent No. 475,077, dated May 17, 1892.

Application filed April 13, 1891. Serial No. 388,765. (No model.)

*To all whom it may concern:*

Be it known that I, SIDNEY O. BIGNEY, of the town of Attleborough, in the county of Bristol, in the State of Massachusetts, have invented a certain new and useful Improvement in Machines for Reducing Tubes; and I declare the following to be a specification thereof, reference being had to the accompanying drawings.

Like letters indicate like parts.

Figure 1 is a top plan of the apparatus adapted to reduce tubes according to my improved process. Fig. 2 is a side elevation of the same with the reducing mechanism in central vertical section. Fig. 3 is an enlarged view, partly in side elevation and partly in vertical section, showing the tubes and the inclosed arbor and the method of supporting the same during the process and of presenting it to the dies. Fig. 4 is an enlarged view in elevation as seen on line $x\ x$ of Fig. 2 and looking in the direction indicated by the two arrows from said line. Fig. 5 is a transverse section on the line $z\ z$ of Fig. 3. Fig. 6 is a sectional view on the line $x'\ x'$ of Fig. 2.

My invention relates to machines for the manufacture of that class of metallic tubes commercially known as "hollow wire" and which is especially useful in the jeweler's art. I reduce the thickness of the tube by means of the hammer-dies of a swaging-machine acting upon limited portions of the tube consecutively while the tube is filled by a metallic arbor and employ means, substantially as hereinafter specified, for feeding the tube to the dies to be reduced and off of the arbor as soon as reduced.

Great difficulty has heretofore been experienced in the manufacture of tubes on account of the lack of any practical method of reducing their thickness and diameter. In this manufacture the tube, especially when plated or covered with gold, must have at first a considerable thickness of stock and also a considerable diameter of the bore. It is usual to form it in short sections or pieces and then to pass it through a draw-plate repeatedly, thus gradually reducing the thickness and diameter and at the same time lengthening the tube. To preserve the exact rotundity of the tube, a metallic arbor is inserted through it, and the tube and arbor so in position are drawn through the draw-plate. The result is that the tube is thus drawn upon the arbor so tightly as to frictionally hold it thereon with great force. The tube is then removed from the arbor by placing one of the butt-ends of the tube against the draw-plate at an opening therein, which is large enough to receive the end of the arbor, but which is too small to receive the tube. Then by fastening the nippers of the draw-board to the arbor the latter is pulled out of the tube. The tube, however, is liable to be injured by such forcible withdrawal, as the resistance comes wholly upon the comparatively thin edge. If the tube is long, the frictional engagement of it upon the arbor is so great that it cannot be removed at all. To facilitate the stripping, therefore, the tubes when completed must be in short sections.

It is the purpose of my invention to provide a simple and efficacious method of reducing tubes, which obviates these difficulties.

In the drawings I represent at A a swaging-machine, more fully described in Letters Patent of the United States No. 268,874. The dies are shown at $a$, the central opening at $b$, and the central tubular space at $c$. The main shaft of the swaging-machine has an enlarged head or end $v$, which is transversely grooved, and the dies $a$ are mounted in said grooves and are movable therein by the pressure of the rollers $w$ as the shaft turns, as is more fully explained in said Letters Patent. The face-plate, through which is the central opening $b$, is fastened to the enlarged head $v$ of the main shaft by the screws $y$. Upon the face of this machine I put a plate B and fasten it in position by a screw $d$.

C is a post or standard, having a plane top plate $e$. A shaft D is mounted in the standard C, and has at its outer end a wheel E rigidly secured thereto, which wheel may be turned by a handle F, as indicated in solid lines, or be driven by power by a belt. (Indicated in Fig. 2 in dotted lines.) The shaft D has a gear G upon it which engages with the cogged wheel H, the latter being fastened upon a shaft I which is mounted in the standard C, as shown. The shaft I is screw-threaded, (see Fig. 2,) and at its inner end bears against the plate B. A fixed guide-rod J extends from the standard C to the plate B, where it is firmly held in place. A supporting-bar K, having slots *f* near one end and having its opposite end *g* bent and slotted, is fastened to the top plate *e* of the standard C by the screws *h*, and thus is capable of a limited longitudinal adjustment. A traveler L, having two vertical plates, which are provided with the apertures *i* and *j* and are bolted together, as seen at *k l*, carries a clamp M, the details of which are shown enlarged in Fig. 4. This clamp consists of two curved jaws *m m*, pivoted together at *n*, so as to be capable of an opening and closing movement. Each jaw *m* has a concave inner screw-threaded surface *o*, adapted to engage with the screw-threads of the shaft I and an extension *p*. To one of the extensions *p* a bent lever N is pivoted, as seen at *q*, and a link O is pivoted to the other extension *p*, as seen at *r*, and to the bent lever N, as seen at *s*. By moving the handle or bent lever N in the direction indicated by the arrow in Fig. 4 the two jaws *m* are closed, so as to engage by their screw-threads with the shaft I. The plate of the traveler L, which is nearer the swaging-machine, extends higher up than the other plate and has an aperture near its upper end. The openings *i* are of a diameter greater than that of the shaft I, so as to allow the sliding of the traveler thereon when the jaws *m* of the clamp M are in the position seen in Fig. 4.

P is a rod or arbor to support the tube Q. R is a loosely-fitting sleeve upon the arbor, and *t* a metallic washer between said sleeve and the plate of the traveler. The arbor P has a transverse groove near its end, as seen in Fig. 3, and a pin *u*, passing through a transverse hole in the bent end *g* of the bar K, prevents the arbor from turning. Braces S extend from the standard C to the face of the swaging-machine and are bolted to give stability to the structure.

The operation of this device is as follows: The tubes Q, the sleeve R, and the washer *t* are placed upon the arbor P, as shown in Figs. 2 and 3. The arbor P is locked in position by the pin *u* in the slotted end *g* of the bar K. The opposite end of the arbor and the ends of the tubes are passed between the dies *a* of the swaging-machine. The traveler L is brought in position to abut the washer *t* and to bring the end of the sleeve R against the outer ends of the tubes Q. The jaws of the clamp M are then shut to engage with the shaft I. Now by the revolution of the wheel E the gearing G H rotates the shaft I, as indicated by the curved arrow in Fig. 2, and the traveler L by its clamp connection M with the shaft I moves toward the swaging-machine, and by its forward plate pushes the tubes Q between and through the dies *a*. The guide-rod J confines the movement of the traveler to a vertical plane. The dies *a*, operating as described in said Letters Patent No. 268,874, hammer down the tube upon the arbor and reduce the thickness of the stock. The continued but gradual rotation of the shaft I forces off the hammered portion of the tube Q from the arbor P, and said tube as reduced gradually passes out through the central opening *c* of the swaging-machine until the tube has been entirely reduced and stripped from the arbor. By removing the dies *a* and substituting other dies having a less caliber the tube Q may be again hammered down upon an arbor of less diameter, and thus the operation is repeated until the desired result is accomplished. To reverse the movement of the traveler, the jaws of the clamp M are opened by moving the handle N in a direction opposite to that indicated by the arrow in Fig. 4, whereupon the jaws are wholly disengaged from the shaft I and the traveler L is pushed back toward the standard C by hand. The adjustment of the bar K upon the top plate of the standard C allows a sufficient movement to properly support by it the arbor P. The action of the hammer-dies gives to a gold-plated tube a much smoother and better finish than is imparted by a draw-plate. The gold is compacted by the blows and the product is superior to a drawn tube. The blows are so numerous and rapid and the advance of the tube to the dies is so slow that every portion of the surface is well hammered and retains its symmetrical appearance. The portion of the tube which is in snug contact with the arbor is only that part which lies between the dies and a little beyond. The part of the tube which has not reached the dies is loose upon the arbor. The part which has been subjected to the dies passes off of the arbor at a short distance beyond them, as appears in Fig. 2. Only a moderate degree of force is necessary to overcome the frictional engagement of the tube upon the arbor along this short distance, and that power is applied to the thicker butt end of the tube. The force or pressure to accomplish this stripping action is that of a screw applied with great leverage and the resistance to be overcome is limited to a short space. I am able thus to reduce and deliver greater lengths or sections of tubes than by the methods commonly used.

I do not wish to confine myself to the use of the particular swaging-machine above described. Any reducing-machine having hammer-dies may be used in this process. Neither do I confine myself to the particular device specified to feed the hollow wire to the reducing-dies. I have illustrated my improved process by the best means known to me; but it is obvious that other feeding devices are also applicable to the process.

The end of the arbor P which passes through the opening of the dies should be hardened, so as to endure the hammering action of the dies; but the remaining part of the arbor does not need to be specially hardened. In this respect also my invention has an advantage over the common method, for it has hitherto been necessary to have the arbor hardened throughout its entire length to resist the action of the draw-plate, and this handening must be uniform, in order that it may everywhere endure the pressure equally.

I claim as a novel and useful invention and desire to secure by Letters Patent—

In combination with a tube-reducing machine having a central aperture and swaging dies, an arbor extending through said aperture and adapted to support the tube which is to be reduced, a traveler suitably supported and movable on said arbor and placed to abut the rear end of the tube, a screw-threaded shaft with means of rotating the said shaft, and a nut or clamp connected with the traveler and capable of engaging with or disengaging from said screw-threaded shaft, substantially as specified.

SIDNEY O. BIGNEY.

Witnesses:
WARREN R. PERCE,
DANIEL W. FINK.